April 1, 1958     J. L. SAFFER     2,828,806
LATCHABLE TILTING SEAT BACK
Filed Dec. 27, 1955     2 Sheets-Sheet 2
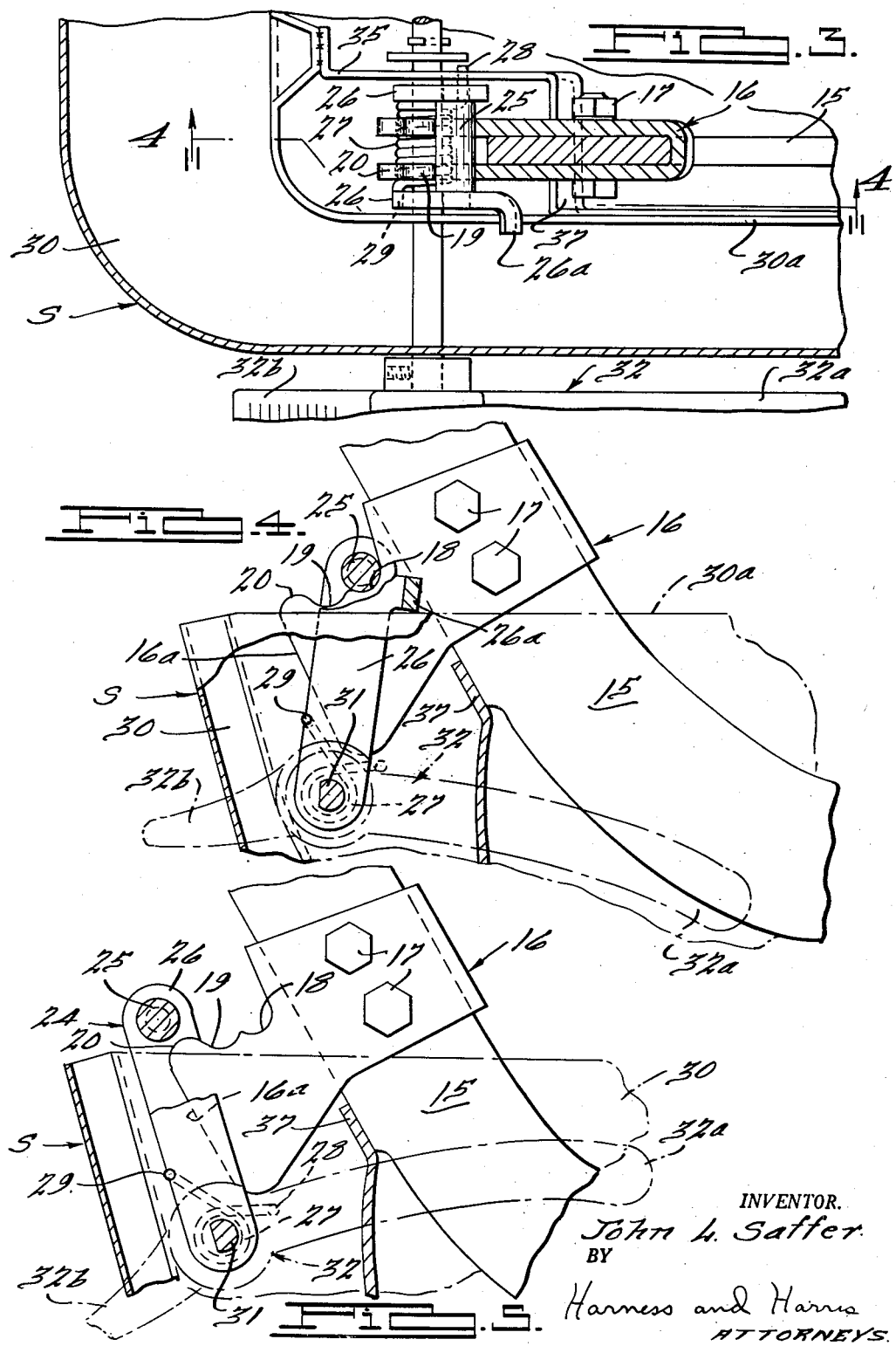
INVENTOR.
John L. Saffer
BY
Harness and Harris
ATTORNEYS.

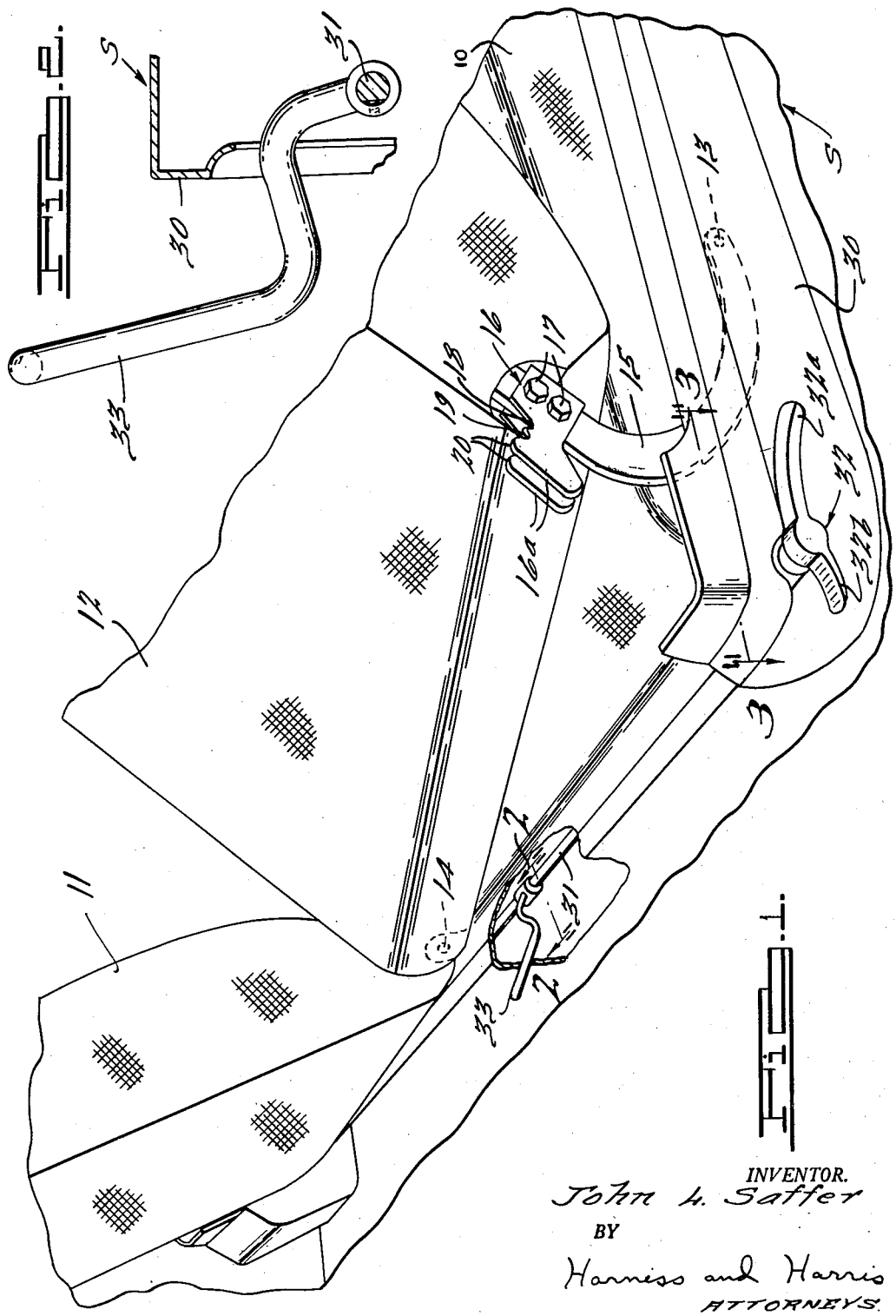

Patented Apr. 1, 1958

2,828,806
LATCHABLE TILTING SEAT BACK

John L. Saffer, Royal Oak, Mich., assignor to Chrysler Corporation, Highland Park, Mich., a corporation of Delaware Application December 27, 1955, Serial No. 555,440

7 Claims. (Cl. 155—152)

This invention relates to seat units having forwardly tilting back portions and particularly to a simplified latch means to prevent unintended forward tilting movement of the seat back portions.

It is a primary object of this invention to provide a novel latch means for association with the conventional forwardly tilting seat back portion which latch means is substantially concealed from view and operable by either the seat occupant or a person positioned rearwardly of the seat unit.

It is another object of this invention to provide a safety seat unit particularly suited for use in vehicles where the locations of the vehicle doors are such that a seat back portion must be tilted forwardly to permit ready entrance to and exit from the seating compartment.

It is still another object of this invention to provide a latch means for releasably locking a tiltable vehicle seat back portion in an upright position when the vehicle is in motion or occupied by an occupant.

It is still another object of this invention to provide a novel folding back vehicle seat construction incorporating releasable latching means for the seat back portion adapted to insure the safety of the seat occupant against injury resulting from forward folding of the seat back on sudden vehicle stops.

It is a further object of this invention to provide releasable latch means for a forwardly folding seat back portion that normally locks the back portion in an erect rigid position but permits ready release of the back portion for folding movement on latch actuation by the seat occupant or persons adjacent any side of the seat.

Other objects and advantages of this invention will become readily apparent from a reading of the following description and a consideration of the related drawings wherein:

Fig. 1 is a fragmentary perspective view of the rear of a split back seat unit having forwardly folding seat back portions one of which is shown in the forwardly folded position;

Fig. 2 is an enlarged, fragmentary, sectional elevational view taken along the line 2—2 of Fig. 1 showing a seat back latch operator;

Fig. 3 is an enlarged, fragmentary, sectional elevational view taken along the line 3—3 of Fig. 1 showing another of the seat back latch operators and the associated latching means;

Fig. 4 is a sectional elevational view taken along the line 4—4 of Fig. 3 showing the seat back latched in upright position; and Fig. 5 is another sectional elevational view, similar to Fig. 4, showing the seat back latching means moved to unlatched position to condition the seat back for forward folding movement.

Vehicles, particularly motor vehicles of the coach type, which have doors positioned such that back portions of the interior seats must be pivoted forwardly to permit passenger entrance to and exit from the vehicle interior, have presented a serious safety problem. This problem is effectively overcome by this invention which provides a novel latch means for folding seat backs. Seating units used in the so-called coach-type vehicles are commonly referred to as folding back or split back seats. Occupants of such seats do not have the same degree of security as an occupant of a seat unit having a rigid back because inertia forces on sudden vehicle stops, or resulting from the impact of vehicle collisions, tend to throw the pivotally mounted seat backs forwardly. Not only is the seat occupant urged off the seat at such times but in addition the seat back does not provide a rigid element that may be grasped by the occupant to prevent him from being thrown forwardly into engagement with forwardly positioned glass panels, steering wheels, dashboards, or other damaging objects. In addition, persons positioned rearwardly of the split back seat occupants may be thrown forwardly against the foldable seat back. Thus, not only is there is a possibility of injury to the occupant of the split-back seat, but in addition, the impact of other persons or objects being thrown against the foldable seat back can cause the vehicle operator to lose control of the vehicle and thereby cause other serious accidents and injuries. Increased car speeds, as well as power braking, tend to accentuate this dangeous problem. The invention herein disclosed is a simple effective means for overcoming the aforementioned dangers. The novel mechanism is arranged so that it may be readily incorporated in existing seating units. Furthermore, it is arranged so that it will cause little inconvenience to the passengers of the vehicle who must tilt the folding back portion of such a seat unit in order to pass into or out of a vehicle. While this invention is described with particular reference to motor vehicles, still, it is thought that it is obvious that it is equally applicable to aircraft, railway vehicles, boats, or the like.

In Fig. 1 of the drawings S represents a split back seat unit having a seat portion 10 and a pair of foldable back portions 11 and 12. Back portion 11 is shown in its upright position whereas back portion 12 is shown in its forwardly folded or collapsed position. The pivot axes 13, 14 for the foldable back section 12 have been indicated in broken lines in Fig. 1. Obviously similar axes (not shown) are used for the foldable back portion 11. Each of the back portions 11 and 12 has an outside hinge arm 15 that connects the back section 11 or 12 to its outside pivot axis 13.

In order to provide an effective means for releasably latching the foldable seat back portions 11, 12 in erect position, each back portion hinge arm 15 has mounted thereon a latch keeper 16. Bolt connectors 17 may be used to anchor the keeper 16 to the hinge arm 15. The bolt connectors 17 can extend through a slot (not shown) in the hinge arm 15 so as to provide for adjustability of the keeper. If adjustability is not required or can be secured by some other means then the keeper 16 can be formed as an integral part of the hinge arm 15.

Keeper 16 is of U-shaped cross sectional configuration so that its leg portions will straddle the hinge arm 15. The upper edge portions of the keeper 16 that project rearwardly from the hinge arm 15 are formed with a pair of substantially semi-circular adjacent notches 18 and 19 respectively. Notches 18 and 19 are shaped to provide latching formations to receive the latch pin 25 of the pivotally mounted latch bolt 24 hereafter described. Keeper 16 also has upwardly extending ear portions 20 at the rear side of the notches 19 to provide a safety lock for the latch pin 25 in the event it should slip out of the latching notch 18 and locate in the latch notch 19. This will be further described after the following description of the latch bolt 24.

Extending crosswise of and journaled in the base frame 30 of the seat S is a latch bolt operating shaft 31. Non-rotatably mounted on each end of the shaft 31 is a latch operating member 32. Each operator 32 has a handle grip portion 32a and a pedal portion 32b. Also non-rotatably connected to the shaft 31 (see Fig. 2) at its mid-length is another latch operating member 33. Latch operator 33 is primarily intended for foot operation but it is also positioned and formed such that it may be hand grasped and actuated by a person located rearwardly of the seat unit S.

Fixed to each end of the shaft 31 is a latch bolt 24. Each latch bolt is formed from a pair of spaced apart legs 26 that support therebetween the latch pin 25. Mounted around the shaft 31 between each pair of latch bolt legs 26 is a torsion coil spring 27. One end 28 of the coil spring 27 is anchored in an aperture in a brace plate 35 of the seat base frame 30. The other end 29 of the coil spring 27 is anchored in one of the legs 26 of latch bolt 24. The coil spring 27 is wound in such a way that it continuously urges the latch bolt in a clockwise direction about the shaft 31. The outermost latch bolt leg 26 (see Figs. 3 and 4) has an integral, outwardly turned, tongue formation 26a that is arranged to engage the top edge 30a of the base frame 30 and limit clockwise rotation of the latch bolt 24.

With the aforedescribed structure it is thought to be obvious that if seat back portion 12 (see Fig. 1) is pushed or pulled rearwardly from its folded position towards its erect position, that during this seat back movement the rear edge portions 16a of the keepers 16 will act as cams on engagement with the latch bolt latch pins 25 and urge the latch bolts 24 rearwardly or counterclockwise until the pins 25 can snap over the keeper ears 20 and seat in one of the sets of latching notches 18 or 19 of the keepers 16. The latch pins 25 will usually be seated in the notches 18 because of the geometry of the latching elements and the action of the springs 27. With the latch pins 25 seated in one or the other of the sets of keeper notches 18 or 19 the foldable back sections 11, 12 of the seat unit will be anchored against forward folding movement. It will also be noted that the hinge arms 15 engage seat base frame portions 37 when the seat back portions 11, 12 are in erect positions and thus the seat back portions are also restrained against further rearward movement.

If an occupant of the seat S should wish to have one or both of the foldable seat back portions 11, 12 released from the associated latch bolts 24 so that the back section or sections can be folded forwardly, it is merely necessary for the seat occupant to grasp one of the latch operating handles 32a and rotate it counterclockwise. This counterclockwise movement will release each latch bolt 24 from its associated keeper 16 and either seat back portion 11 or 12 may then be folded forwardly.

If a person located rearwardly of the seat unit S should desire to fold one or both of the seat back portions 11, 12 forwardly, he may step down upon the treadle portion 32b of either of the operators 32 or he may actuate the centrally located operator 33 in a counterclockwise direction and this will also release the latch bolts 24 from their associated keepers 16.

Thus it will be seen that this invention provides means for normally latching foldable seat back sections in erect positions while including readily operable means whereby the occupant of a foldable back seat or a person located rearwardly of the foldable back seat can quickly and easily release the seat back sections for forward folding. Impact forces or sudden stops will not release the latch bolts 24 from the keepers 16. If a force should be applied to the back of the seat tending to move the keeper notches 18 forwardly out of engagement with the latch pins 25, then the notches 19 and ears 20 will engage the latch pins 25 and prevent any additional forward movement of the foldable seat back portions 11, 12. Notches 19 and ears 20 of the keepers 16 thus provide safety lock means for the foldable seat backs 11, 12.

I claim:

1. A vehicle seat unit comprising a seat portion rigidly resting on a base frame and a back portion pivotally mounted on said base frame for movement between a substantially vertical erect position to a forwardly folded position overlying said seat portion, and releasable latch means to anchor said back portion in erect position including latch operator means arranged for operation by an operator located forwardly of and rearwardly of the said back to effect release of said latch means, said latch means comprising keeper means mounted on one of said seat unit portions and an actuable latch member movably mounted on the other of said seat unit portions and arranged for selective latching engagement with said keeper means, said keeper means including cam means engageable with said latch member during rearwardly folding movement of said back portion to move said latch member into latch engaging position during rearwardly folding movement of said back portion and resilient means to provide for automatic latching engagement of said latch member and keeper means at the end of rearwardly folding seat back movement.

2. A vehicle seat comprising a seat unit portion rigidly resting on a base frame and a back portion pivotally mounted on said base frame for movement between a substantially vertical erect position to a forwardly folded position overlying said seat portion, and releasable latch means to anchor said back portion in erect position including latch operator means arranged for operation by an operator located forwardly of and rearwardly of the said back to effect release of said latch means, said latch means comprising keeper means mounted on one of said seat unit portions and an actuable latch member pivotally mounted on the other of said seat unit portions and arranged for selective latching engagement with said keeper means, said keeper means including cam means engageable with said latch member during rearwardly folding movement of said back portion to move said latch member into latching position during rearwardly folding movement of said back portion, and resilient means to provide for automatic latching engagement of said latch member and keeper means during rearwardly folding seat back movement, said keeper means further including spaced apart latching formations to matingly engage said latch member and provide a first back portion latching means and a second safety latch means for said back portion that is automatically engaged on disengagement of said first latching means, said second safety latch means having an elongated portion to prevent accidental disengagement of said latch means.

3. A vehicle seat comprising a base frame, a seat portion resting on said base frame and a back portion pivotally mounted on said base frame for movement between a substantially vertical erect position to a forwardly folded position overlying said seat portion, and releasable latch means to anchor said back portion in erect position including latch operator means arranged forwardly of and rearwardly of the said back to effect release of said latch means, said latch means comprising a notched keeper means mounted on said back portion and a latch bolt means mounted on said base frame comprising a rotatable shaft journaled in said base frame and actuable by said operator means, a latch pin mounted on said shaft and arranged for movement into and out of latching engagement with said notched keeper on oscillation of said shaft, and resilient means continuously urging said latch pin into latching engagement with said keeper.

4. A vehicle seat comprising a base frame, a seat portion resting on said base frame and a back portion pivotally mounted on said base frame for movement between a substantially vertical erect position at the rear of the seat portion to a forwardly folded position overlying said seat portion, and releasable latch means to anchor said back portion in its erect position including latch operator means arranged forwardly of and rearwardly of the said back to effect release of said latch means, said latch means comprising a notched keeper means mounted on said back portion and a latch bolt means mounted on said base frame comprising a rotatable shaft journaled in said base frame and actuable by said operator means, a latch pin mounted on said shaft and arranged for movement into and out of latching engagement with said notched keeper on oscillation of said shaft, resilient means continuously urging said latch pin into latching engagement with said keeper and cam means on said keeper means to provide for automatic latching of said back portion in its erect position when said seat back portion is moved to its erect position from its folded position.

5. A vehicle seat comprising a base frame, a seat portion resting on said base frame and a back portion pivotally mounted on said base frame for movement between a substantially vertical erect position at the rear of the seat portion to a forwardly folded position overlying said seat portion, and releasable latch means to anchor said back portion in its erect position including latch operator means arranged forwardly of and rearwardly of the said back to effect release of said latch means, said latch means comprising a notched keeper means mounted on said back portion and a latch bolt means mounted on said base frame comprising a rotatable shaft journaled in said base frame and actuable by said operator means, a latch pin mounted on said shaft and arranged for movement into and out of latching engagement with said notched keeper on oscillation of said shaft, resilient means continuously urging said latch pin into latching engagement with said keeper and cam means on said keeper means to provide for automatic latching of said back portion in its erect position when said seat back portion is moved to its erect position from its folded position, said rotatable shaft having latch operator means thereon located at each end portion and an additional latch operator means thereon positioned adjacent a rear side of said seat.

6. A vehicle seat comprising a base frame, a seat portion resting on said base frame and a split-back comprising a plurality of back portions each pivotally mounted on said base frame for movement between a substantially vertical erect position at the rear of the seat portion to a forwardly folded position overlying said seat portion, and releasable latch means to anchor each of said back portions in an erect position including latch operator means arranged at a side of the seat having a handle portion extending forwardly of said seat back readily operable by the seat occupant to effect release of said latch means and a treadle portion extending rearwardly from said seat back readily operable by a person located rearwardly of said seat back to effect release of said latch means, said latch means comprising a notched keeper means mounted on each of said back portions and latch bolt means mounted on said base frame and engageable with each of said keeper means comprising a rotatable shaft journaled in said base frame and actuable by said operator means, latch pin means mounted on said shaft and arranged for movement into and out of latching engagement with each notched keeper on oscillation of said shaft, resilient means continuously urging said latch pin means into latching engagement with said keepers and cam means on said keeper means to provide for automatic latching of said back portions in erect position when said seat back portions are moved to erect positions from their folded positions.

7. A vehicle seat comprising a base frame, a seat portion resting on said base frame and a split-back comprising a plurality of back portions each pivotally mounted on said base frame for movement between a substantially vertical erect position at the rear of the seat portion to a forwardly folded position overlying said seat portion, and releasable latch means to anchor each of said back portions in an erect position including a latch operator means arranged at a side of said seat portion having a handle portion extending forwardly of the said back portion readily operable by the seat occupant to effect release of said latch means and also including a treadle portion at the side of the seat portion extending rearwardly therefrom and readily operable by a person located rearwardly of the seat unit to effect release of said latch means, said latch means comprising a first latch element mounted on each of said back portions and a second latch element mounted on said base frame comprising a rotatable shaft journaled in said base frame and actuable by said operator means, said latch elements being arranged for movement into and out of latching engagement with each other on oscillation of said shaft, resilient means continuously urging said latch elements into latching engagement with each other to provide for automatic latching of said back portions in erect positions when said seat back portions are moved to erect positions from their folded positions.

References Cited in the file of this patent

UNITED STATES PATENTS

| | | |
|---|---|---|
| 412,617 | Hogan | Oct. 8, 1889 |
| 823,372 | Stevens et al. | June 12, 1906 |
| 2,559,548 | Seigneur | July 3, 1951 |
| 2,624,613 | Parmely | Jan. 6, 1953 |